United States Patent Office 2,935,173
Patented May 3, 1960

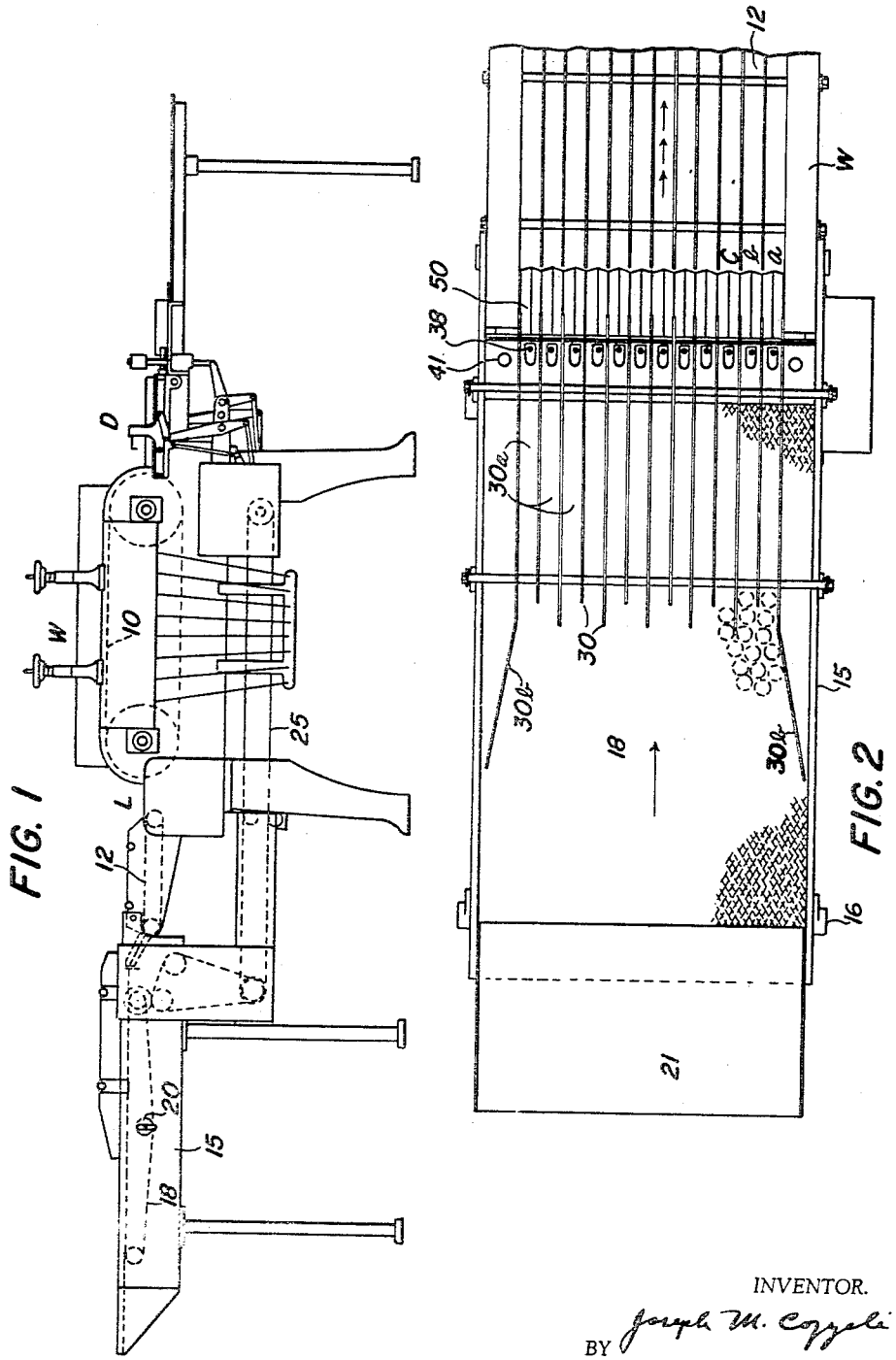

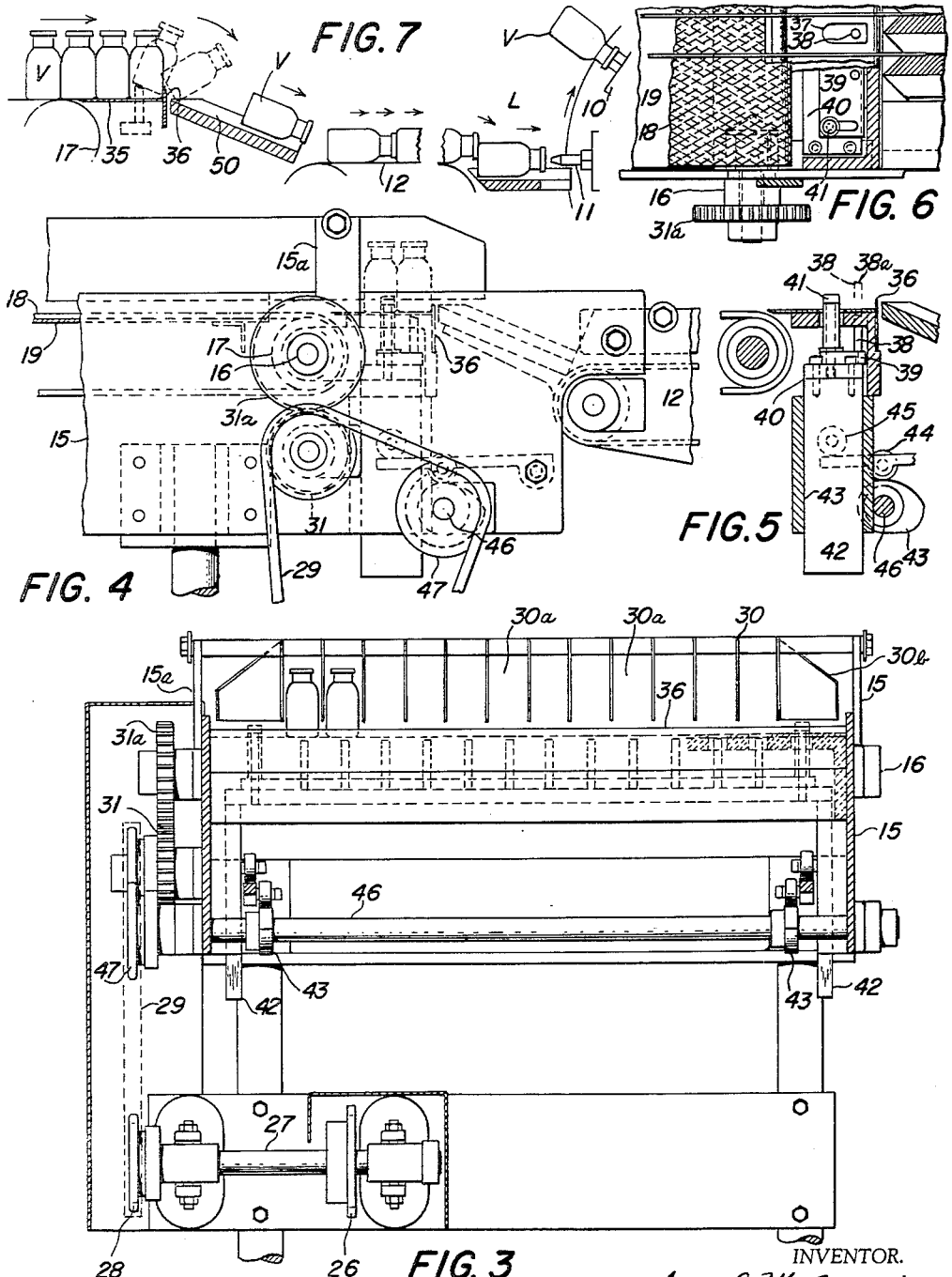

2,935,173

VIAL ARRANGING AND FEEDING MEANS

Joseph M. Cozzoli, North Plainfield, N.J.

Application July 3, 1958, Serial No. 746,429

5 Claims. (Cl. 198—30)

This invention relates to a method and means for orienting articles in a defined order and manner for subsequent processing. In its broader aspects the invention concerns a means for unscrambling a bulk supply of articles so as to arrange them in single-file formation and thereafter reorient the articles to a different position and successively feed them through one or more processing stages. In its more particular aspects the invention concerns a means for orienting a bulk supply of containers, such as open-mouthed vials, from a standing position to a horizontal position and automatically placing them on washing jets for internal and/or external cleansing. A main objective of the invention is the elimination of the tasks of hand removing the vials from the factory-packed cartons and of hand loading the vials on the washing machine. It is in connection with operational methods of this character that the important features of the invention will be typified and explained.

A form of washing machine with which the orienting and loading mechanism of this invention has particular utility is disclosed in the patents to Frank Cozzoli #2,381,436 (ampul washing) and #2,738,115 (vial washing), each of which is an indexible-conveyor-type machine having a series of movable trays each equipped with a series of washing needles or jets upon which the containers are mounted and carried through one or more washing stations. In some machines the containers are individually placed in V-shaped troughs and blown forward onto the jets. In other machines the containers are placed individually on a conveyor which cyclically feeds them onto the jets. In both instances mentioned, however, there remains the problem of hand loading and disadvantages such as operator fatigue, operator failure to keep up with the machine, and the ever present hazard of glass breakage. The present invention undertakes to overcome the foregoing difficulties and to provide an automatic means for arranging bulk lots of containers, vials, etc. and to orient them single file, directionally positioned, and to present them automatically to the loading station of the conventional washer.

The invention comprises, in the main, a relatively large flat-top conveyor upon one end of which tray-like cartons of unwashed vials may be dumped in upstanding, random-order formation. The conveyor is preferably power driven and carries the mass of vials toward a plurality of stationary partitions that are spaced from each other a distance sufficient to accommodate the vials single-file therebetween and preferably in accordance with the spacing of the washing jets of the washer. As the bank of vials is carried forward the leading vials engage the ends of the partitions and gradually find their way between the partitions and the first step of orienting in defined rows has been accomplished.

Continued movement of the conveyor brings the rows of vials to an upstanding abutment that extends across the ends of the rows and the vials in the rows stop their advancing movement while the conveyor continues to move beneath the vials.

Underlying the leading vial in each row is a vertically reciprocable pin whose vertical movement is timed with the indexing movements of the washer. Preferably the movable pins are positioned slightly back of the center of the lead vials so as to bias the vials forward as the pins elevate. Each vial is guided at both sides so that the biasing force of the pin tips the vial forward and causes it to fall over the barrier open-end first onto a downwardly inclined chute.

Preferably the chutes are provided with V-shaped bottoms that maintain the alignment and spacing of the vials as they move forward, open-end first and horizontally disposed, toward the jets of the washer. This second conveyor, which may be termed a feeding conveyor, is caused to move intermittently in timed relation with the indexing movements of the washer so that during the dwell period of a bank of jets in horizontal position, a bank of horizontal vials is moved forward and the lead vial in each row telescopes a related jet. Thereafter the feeding conveyor stops and the bank of jets, with vials mounted thereon, moves out of the loading station. When the new bank of empty jets arrive at the loading station the feeding conveyor again starts and places another bank of vials to be washed on the jets. Meanwhile the unscrambling conveyor, first mentioned, is continuously orienting the bulk supply of vials into defined rows and presenting them to the tipping-over station. And since the tipping is synchronized with the indexing cycle of the washer a new bank of vials is tipped onto the feeding conveyor at one end while a bank of vials is removed from the other end. The loading of the washer thereby becomes fully automatic, the only demand on the operator being that periodically replenishing the loading conveyor by any suitable means, with bulk lots of the vials to be processed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as parts of this disclosure and, in such drawings, like characters of reference denote corresponding parts throughout all the views, of which:

Fig. 1 of the drawings is an essembled view of the vial arranging unit of this invention in cooperative relation with a vial washing machine and its tray-loading attachment.

Fig. 2 is a plan view of the vial arranger and a portion of the feeding conveyor.

Fig. 3 is an end elevation, partly in section, of the vial-arranger and vial-tipping mechanism.

Fig. 4 is an elevational view of the vial-tipping end of the vial arranger.

Fig. 5 is a sectional view of portions of the tipping mechanism.

Fig. 6 is a plan view partly in section of a portion of the vial-tipping mechanism.

Fig. 7 is a schematic drawing of the method of orienting the vials from upstanding position to horizontal position and of placing them on the jets of the washing machine.

Referring more particularly to Fig. 1 of the drawings the invention is disclosed in connection with a jet-type indexible-conveyor washing machine W. The conveyor 10 carries rows of jets 11 on which the vials V to be washed are placed. The washer is of conventional design and operates to receive the vials horizontally at a loading station L, index then to an inverted position and then through a plurality of washing stations. Thereafter the vials are moved to a delivery station D where they are removed from the jets, and if desired loaded automatically into suitable receiving trays. Additional particulars on machines of this general character may be had by referring to the patents to Cozzoli #2,738,115, 2,379,789, 2,604,896, and others.

The loading of washers of the character explained presents the problem and while semi-automatic aids have been developed, such as belt conveyor 12 illustrated in part in Figs. 2 and 7, the constant attendance of one or more operators is required in removing vials from cartons and the hand placing of the vial in the respective channels $a$, $b$, $c$, of the conveyor 12. With washers operating for example at 6000 to 12,000 vials per hour, the manual task of loading becomes not only difficult and expensive but with the ever present risk and hazard of encountering fractured vials or the inadvertent misplacing vials.

The present invention undertakes to provide a simple mechanism for eliminating the previous need to handle and place vials individually in their proper position in the loading channels, and which includes a frame extension 15 that is aligned with the washer at the forward or loading end thereof. The extension provides journal bearings 16 that rotatably support a pair of rolls 17 around which a conveyor belt 18 is trained. The upper run of the belt is supported upon a tray-like member 19 that extends between the side rails 15. The under run of the conveyor carries a belt-tensioner roll 20.

As represented more clearly in Fig. 2 approximately half of the upper run of the conveyor belt is reserved for a bulk supply of vials. This area may be increased if desired by providing an extension table 21. One convenient method of bulk loading the conveyor consists in inverting tray-like cartons of vials directly on the shelf and conveyor and then lifting off the empty carton. In such a case the vials will be packaged by the manufacturer in shallow tray-like cartons open-end down in rows or in staggered formation. A tray of vials so packaged is brought to the machine and by placing and holding a plate or sheet of approximately the same area as the tray upon the top of the tray, which will be the bottoms of the vials therein, the carton may be inverted and placed sheet-side down on the conveyor. When the sheet is slid from beneath the vials the latter are left standing upright on the conveyor. When the shipping carton is lifted off the vials and any partitions or paper dividers removed, a relatively large number of vials will have been loaded on the machine in a single operation and without individual handling.

As herein indicated the loading conveyor is driven at a continuous rate conveniently from the main washing machine as by means of a chain 25 that drives sprocket 26 on a jack shaft 27. This shaft 27 carries another sprocket 28 over which a chain 29 is trained and the latter drives the drive roll 17 of the conveyor. The linear speed of the conveyor relative to index cycles of the washer may be determined to suit a given range by varying the ratio of intermediate gear 31 and 31$a$ that are interposed between the chain drive 29 and the drive roll 17 of the conveyor.

When a bulk supply of vials have been placed on the conveyor 18 they will be carried forward slowly until they encounter the ends of a series of relatively stationary dividers or partitions 30 that extend generally parallel with the line of movement, and divide the area into a number of channels 30$a$ which in number and spacing correspond to the number and spacing of the channels $a$, $b$, $c$ of the intermittant conveyor 12 previously mentioned. The divider assembly 30 is constructed preferably in the form of a removable rack that may be interchanged with others constructed to provide a different width or number of channels 30$a$.

As the vials, in random order, are carried forward by the moving conveyor the leading vials encounter the dividers 30 and gradually find their way between the divider strips and arrange themselves in single-file order.

Continued movement of the rows of vials brings the lead vials over a short dead plate 35 and to a transversely extending barrier member 36. Forward movement of the vials standing in each row is thereby suspended while the conveyor belt 18 continues to move and continuously supply the leading ends of the channels with vials. It has been found that a conveyor belt having a roughened surface such as the surface produced by the interlaced coils of a wire-mesh belt, creates sufficient agitation of the vials at the leading end of the channels to prevent or upset any tendency of the vials to bridge at the entrance ends of the runways. Bridging is also minimized by constructing the outer channel dividers with relatively long leading ends 30$b$. These ends may be flared outwardly according to the width of the conveyor. It has been found that best results are obtained when the flaring ends are spaced away from the side frames so that they may yield laterally as needed to the pressure of oncoming vials and spring back into place. This non-cyclic spring action further tends to break up any tendency of the vials to arrange themselves into any definite or interlocking pattern as they are moved forward. As illustrated most clearly in Figs. 3 and 4 divider-rack assembly 30 is supported on upstanding posts 15$a$ from the conveyor side frames 15 and overhangs the conveyor belt 18.

Ahead of the transverse barrier 36 a series of openings 37 are provided in the dead plate 35 through which a series of pins 38 are adapted to reciprocate in timed relation with the indexing cycles of the washing machine. The pins 38 are carried on a pin bar 39 that underlies the dead plate and extends across the machine. Each pin 38 is positioned approximately central with a given channel made by the rack 30 and the group are adjustable toward or away from the barrier 36 by adjusting the pin bar 39 on its support 40. Clamping means in the form of extended clamp screws 41 operative through elongated slots in the bar are provided to secure the pin bar 39 in adjusted position. The support 40 for the pin bar includes a pair of slides 42 that are mounted in vertical guides 43 secured to each side frame. The slides are moved vertically by means of cam element 43 that operate levers 44 which in turn coact with rollers 45 carried by the slides. The cams 43 are mounted upon a shaft 46 that extends across the machine and carries a sprocket 47 over which the chain 29 is trained. The contour of the pin-bar cams 43 is such as to effect a relatively slow elevation of the pins 38, a momentary dwell of the pins in elevated position, and followed by a relatively fast descent and a dwell in the lowered position. With the gearing and transmission arranged to give one revolution of the cam shaft 46 for each index cycle of the washing machine, as herein proposed, it will be seen that the pin bar moves cycle-for-cycle with the washer.

The purpose of the vertically movable pins 38 is to tip the lead vial in each channel over the barrier 36. At the start of the cycle the tops of the pins are below the surface of the dead plate 35 and the lead vial is advanced thereover to its stopping position against the barrier 36. Thereafter the pins elevate slowly and, being adjusted to engage the vials slightly back of center, cause a tipping of the lead vials over the barrier. Inasmuch as the vials are guided on both sides by the partitions of the rack 30 and at their rears by the next succeeding vials, they can fall only forward and into the downwardly-inclined V-shaped channels of a plate 50 attached to the intermittent conveyor 12 of the washing machine W. The plate 50 conducts the vials to the conveyor belt 12, all aligned open-mouth forward, where they are progressively advanced onto the washing jets of the washer. After each bank of vials is urged onto their respective jets, as illustrated in Fig. 7, the conveyor 12 which is intermittently driven, hesitates momentarily to allow the loaded jets to move out of position and a new bank of jets to move into position for loading.

It will be noted that as the pins 38 elevate and tip the lead vials in each row, the next oncoming vial in each row engages the heel of the tipping vial and assists in the toppling action. The oncoming vials may not, however, advance too far because the elevating pins project into the respective channels and block further travel until the first vials have fallen clear and the pins have receded to their lowermost positions out of the runways. The vial-advancing and tipping cycle is then ready to repeat. As illustrated in the drawings each of the pins 38 may have its upper end slanted from front to back as at 38a to facilitate the tipping action and also to prevent a vial from standing upright thereon.

It will be understood that the tipping pins 38 will be adjusted to operate closer to the barrier 36 when running small diametered vials and further from the barrier when running larger diametered vials. In each case, however, the pins should engage the bottoms of the vials slightly back of center to ensure the tipping forward thereof. And also that the lineal speed of the orienting conveyor belt 18 is to be great enough in inches-per-cycle to ensure not only the advancing of the lead vials to the barrier in the down-dwell period of the pins 38 but to ensure that any gap in the rows of vials that may be created by a momentary hesitancy of the vials at the points of entry into the respective channels will be closed up and maintain the abutting relation of vial-to-vial within the channels in ample time to effect the cyclic tipping function and the feeding conveyor 12 of the washer fully loaded at all times.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, the following combinations and elements, or equivalents thereof are claimed by Letters Patent of the United States:

1. Vial-arranging means comprising a conveyor having a surface area at its forward end adapted to receive a bulk supply of upstanding vials arranged without regard to order or pattern, channeling means overlying the conveyor and interposed in the path of movement of the vials for guiding the vials into defined rows, a barrier member at the delivery end of each of the rows adapted normally to bar the passage of the leading vial in each row, and vial-tipping means including a movable pin member associated with each channel formed by the channeling means, said pin members being positioned ahead of the barrier member with respect to the direction of movement of the vials in the channels and normally below the path of travel of the vials toward the barrier, operative upon the underside of the lead vial in each row to tip the lead vial over the barrier, and driving means for the conveyor and for said vial-tipping means.

2. The combination of claim 1 in which said channeling means for guiding the vials into defined rows extends beyond the barrier member and vial-tipping means and continue to guide the vials and maintain the row formation during the tipping operation.

3. Vial-arranging means comprising an endless-belt conveyor having a surface area at its forward end adapted to receive a bulk supply of vials arranged without regard to order or pattern, channeling means along the course of the upper run of the conveyor and interposed in the path of movement of the vials for guiding the vials into defined rows, a barrier member at the delivery end of each channel formed by the channeling means adapted normally to bar the passage of the leading vial in each row, and vial-tipping means operative upon the lead vial in each row to tip the lead vial over the barrier and simultaneously block the advancing movement of the next succeeding vial, said vial-tipping means including a vertically movable pin member associated with each channel made by the channeling means, each of said pin members having a forwardly-slanted upper end and positioned ahead of the barrier a distance not more than one vial diameter, and said pin members being operative on vertical movement to engage the undersides of the leading vials in the channels and means for driving the conveyor continuously and for driving said vial-tipping means intermittently.

4. The combination of claim 3 in which the said channeling means comprises a plurality of partition elements spaced apart as to form a plurality of vial channels, the outer partition elements having their leading ends extending beyond the ends of the intermediate partition elements and resiliently supported for lateral movement in response to the pressure of the oncoming vials.

5. Vial-arranging means comprising an endless conveyor having an open area at its forward end adapted to receive a bulk supply of vials in upstanding position and a dead plate at its delivery end over which the vials are successively moved, channeling means overlying the conveyor and interposed in the path of movement of the vials for guiding the vials into defined rows, a barrier member underlying a channeling means at the delivery end of the dead plate adapted normally to engage the lower portions of the vials and bar the passage of the leading vial in each row, and means cyclically operative upon the lead vial in each row to tip the lead vial over its associated barrier, said vial-tipping means including a movable pin member associated with each channel formed by said channeling means, said pin members being positioned ahead of the barrier member with respect to the direction of movement of the vials and normally below the path of travel of the vials toward the barrier, and said pin members being vertically movable so as cyclically to engage the undersides of the leading vials and to tip them over the barrier, and means for adjusting the pin members toward and away from the barrier to suit the diameter of the vials.

References Cited in the file of this patent

UNITED STATES PATENTS

| | | |
|---|---|---|
| 1,179,383 | Adderson | Apr. 18, 1916 |
| 2,586,586 | Washburn | Feb. 19, 1952 |
| 2,614,678 | Ladewig | Oct. 21, 1952 |
| 2,710,089 | Kerr | June 7, 1955 |
| 2,861,670 | Read | Nov. 25, 1958 |